(12) United States Patent
Yamazaki (10) Patent No.: US 8,777,208 B2
(45) Date of Patent: Jul. 15, 2014

(54) IMAGE FORMING APPARATUS, IMAGE FORMING METHOD, IMAGE FORMING PROGRAM, AND RECORDING MEDIUM

(75) Inventor: Masataka Yamazaki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 594 days.

(21) Appl. No.: 13/067,691

(22) Filed: Jun. 21, 2011

(65) Prior Publication Data

US 2012/0002230 A1  Jan. 5, 2012

(30) Foreign Application Priority Data

Jul. 1, 2010 (JP) ................................ 2010-150735

(51) Int. Cl.
*B65H 7/20* (2006.01)
(52) U.S. Cl.
USPC ............ 271/3.17; 399/85; 399/381; 399/388
(58) Field of Classification Search
USPC .............. 271/3.14, 3.17; 399/16, 82, 85, 381, 399/388
See application file for complete search history.

(56) References Cited

U.S. PATENT DOCUMENTS

| 6,085,063 | A  * | 7/2000 | Morita et al. ................. 399/381 |
| 6,945,715 | B2 * | 9/2005 | Nakatani et al. ................ 400/61 |
| 7,706,736 | B2 * | 4/2010 | Watanabe ..................... 399/361 |
| 8,532,508 | B2 * | 9/2013 | Kurita ............................. 399/43 |
| 2008/0075478 | A1 * | 3/2008 | Kohara .......................... 399/16 |
| 2010/0066005 | A1 * | 3/2010 | Ueda ........................... 271/3.17 |

FOREIGN PATENT DOCUMENTS

JP    2008-080624 A    4/2008
JP    2008-134443 A    6/2008

* cited by examiner

*Primary Examiner* — Ernesto Suarez (74) *Attorney, Agent, or Firm* — Harness, Dickey & Pierce, P.L.C.

(57) ABSTRACT

An image forming apparatus includes a feeding delay control unit to control a delay in feeding image formation media to a conveying unit and a counting unit to count a number of image formation media discharged to a discharge tray. When a count value of the counting unit reaches a threshold, the feeding delay control unit causes a feeding unit to switch a feeding mode from a small spacing mode, in which a next image formation medium is fed while a previously-fed image formation medium is on a conveying path, to a large spacing mode, in which an image formation medium is fed after a previously-fed image formation medium is discharged from the conveying path. When a number of image formation media on which images have been formed is smaller than a upper limit, the feeding mode is returned from the large spacing mode to the small spacing mode.

10 Claims, 6 Drawing Sheets

IMAGE FORMING APPARATUS, IMAGE FORMING METHOD, IMAGE FORMING PROGRAM, AND RECORDING MEDIUM

CROSS-REFERENCE TO RELATED APPLICATIONS

The present application claims priority to and incorporates by reference the entire contents of Japanese Patent Application No. 2010-150735 filed in Japan on Jul. 1, 2010.

BACKGROUND OF THE INVENTION

1. Field of the Invention

The present invention relates to an image forming apparatus, an image forming method, an image forming program, and a recording medium, and more specifically, an image forming apparatus, an image forming method, an image forming program, and a recording medium that perform image formation processing appropriately by keeping a maximum number of sheets to be printed.

2. Description of the Related Art

Conventionally, in image forming apparatuses such as a facsimile, a copying machine, a multifunction peripheral, and a printer, in order to save paper resources, other expendable supplies, power consumption, and the like, a limit is often set to the number of images to be formed in each image forming apparatus.

Especially in recent years, in accordance with rapid prevalence of image forming apparatuses, many image forming apparatuses have been connected to networks, and image forming is performed by using a plurality of image forming apparatuses, and hence, reduction in a total cost of ownership (TCO) becomes important in offices and the like. In order to reduce the amount of paper consumption, the consumption of other expendable supplies, and the power consumption, it is necessary to set an upper limit on a use of resources in each of the image forming apparatuses. Namely, it is necessary to set an upper limit on the number of printable sheets with each of the image forming apparatuses to restrict the number of sheets that are going to be printed.

In addition, in the image forming apparatuses, in order to improve a productivity of image forming (printing), there is an approach termed "advanced sheet feeding" in which a sheet as a target for printing is conveyed from a sheet feed tray to an image forming unit and a sheet for the next page starts to be fed from the sheet feed tray in a state in which a sheet for the previous page (a sheet previously fed) is present on a conveying path along which the sheet having an image formed thereon by the image forming unit is discharged to a discharge tray. That is, an improvement in productivity is achieved by performing high-speed feeding that is realized by decreasing an inter-sheet spacing that is a spacing between two successive sheets.

Regarding a setting of the upper limit on the number of printable sheets, conventionally, a technique is proposed to stop feeding a sheet from a sheet feeding unit when the sum of the number of sheets that are still on a conveying path after being sent out from the sheet feeding unit and the number of sheets that have been discharged to a discharge unit reaches an upper limit on the number of sheets (see Japanese Patent Application Laid-open No. 2008-80624).

However, according to the above-described conventional technique, when the number of printed sheets, which is counted by including the number of sheets present on the conveying path, reaches the upper limit on the number of printable sheets, the feeding of sheets from the sheet feed tray is stopped. Accordingly, the feeding is abruptly stopped while high-speed feeding is performed with a small inter-sheet spacing to increase a load applied to a sheet feeding mechanism. As a result, there arises a problem in that a size of the sheet feeding mechanism becomes large to increase a cost for producing a sheet feeding apparatus.

SUMMARY OF THE INVENTION

It is an object of the present invention to at least partially solve the problems in the conventional technology.

According to an aspect of the present invention, there is provided an image forming apparatus that includes a medium housing unit that houses a plurality of image formation media; an image forming unit that forms an image on the image formation medium; a discharge tray to which the image formation medium having the image formed thereon by the image forming unit is discharged; a feeding unit that feeds the image formation media one by one from the medium housing unit; a conveying unit that conveys the image formation medium fed from the medium housing unit by the feeding unit onto a conveying path extending from the medium housing unit to the discharge tray through the image forming unit; a counting unit that counts the number of image formation media discharged to the discharge tray within a predetermined period, by detecting the image formation media discharged to the discharge tray; a number acquiring unit that acquires, from an image forming job, the number of image formation media on which images are formed according to the image forming job; a feeding delay control unit that causes the feeding unit to feed the image formation medium in a small spacing mode under which a next image formation medium is fed during at least a previously-fed image formation medium is present on the conveying path and feed the image formation medium in a large spacing mode under which a next image formation medium is fed after at least a previously-fed image formation medium is discharged from the conveying path, by switching a feeding mode from the small spacing mode to the large spacing mode at a time when a count value of the counting unit reaches a threshold set to be smaller than an upper limit by which image formation is limited; a return control unit that, when a total number of image formation media on which images have been formed is smaller than the upper limit after the image formation media is started to be fed in the large spacing mode, switches the feeding mode from the large spacing mode to the small spacing mode so as to allow the feeding unit to feed the image formation media in the small spacing mode, the total number of image formation media being acquired by adding the count value of the counting unit to the number of image formation media acquired from the image forming job by the number acquiring unit; and a threshold setting unit that sets the threshold based on image forming conditions used for forming images on the image formation media.

According to another aspect of the present invention, there is provided an image forming method that includes feeding, from a medium housing unit that houses a plurality of image formation media, the image formation media one by one; forming an image on the image formation medium; conveying the image formation medium fed from the medium housing unit at the feeding onto a conveying path extending from the medium housing unit to a discharge tray through the forming; counting the number of image formation media discharged to the discharge tray within a predetermined period, by detecting the image formation media discharged to the discharge tray; acquiring, from an image forming job, the number of image formation media on which images are formed according to the image forming job; feeding the image formation medium in a small spacing mode under which a next image formation medium is fed during at least a previously-fed image formation medium is present on the conveying path and feeding the image formation medium in a large spacing mode under which a next image formation medium is fed after at least a previously-fed image formation medium is discharged from the conveying path, by switching a feeding mode from the small spacing mode to the large spacing mode at a time when a count value at the counting reaches a threshold set to be smaller than an upper limit by which image formation is limited; switching, when a total number of image formation media on which images have been formed is smaller than the upper limit after the image formation media is started to be fed in the large spacing mode, the feeding mode from the large spacing mode to the small spacing mode so as to feed the image formation media in the small spacing mode, the total number of image formation media being acquired by adding the count value at the counting to the number of image formation media acquired from the image forming job at the acquiring; and setting the threshold based on image forming conditions used for forming images on the image formation media.

According to still another aspect of the present invention, there is provided a computer program product comprising a non-transitory computer-readable medium having computer-readable program codes recorded in the medium for forming an image in an image forming apparatus that includes a medium housing unit, an image forming unit, a discharge tray, a feeding unit, and a conveying unit, the program codes when executed causing a computer to execute: feeding, from the medium housing unit that houses a plurality of image formation media, the image formation media one by one by the feeding unit; forming an image on the image formation medium by the image forming unit; conveying the image formation medium fed from the medium housing unit by the feeding unit onto a conveying path extending from the medium housing unit to the discharge tray through the forming; counting the number of image formation media discharged to the discharge tray within a predetermined period, by detecting the image formation media discharged to the discharge tray; acquiring, from an image forming job, the number of image formation media on which images are formed according to the image forming job; causing the feeding unit to feed the image formation medium in a small spacing mode under which a next image formation medium is fed during at least a previously-fed image formation medium is present on the conveying path and feed the image formation medium in a large spacing mode under which a next image formation medium is fed after at least a previously-fed image formation medium is discharged from the conveying path, by switching a feeding mode from the small spacing mode to the large spacing mode at a time when a count value at the counting reaches a threshold set to be smaller than an upper limit by which image formation is limited; switching, when a total number of image formation media on which images have been formed is smaller than the upper limit after the image formation media is started to be fed in the large spacing mode, the feeding mode from the large spacing mode to the small spacing mode so as to feed the image formation media in the small spacing mode, the total number of image formation media being acquired by adding the count value at the counting to the number of image formation media acquired from the image forming job at the acquiring; and setting the threshold based on image forming conditions used for forming images on the image formation media.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, preferred embodiments of the invention will be described in detail with reference to the accompanying drawings. Since the embodiments described below are preferred embodiments of the invention, various limitations, which are technically desirable, are applied thereto. However, the scope of the invention is not unduly limited by the description presented below, and not all the configurations described in each embodiment are the essential prerequisites of the invention.

First Embodiment

Figure 1:
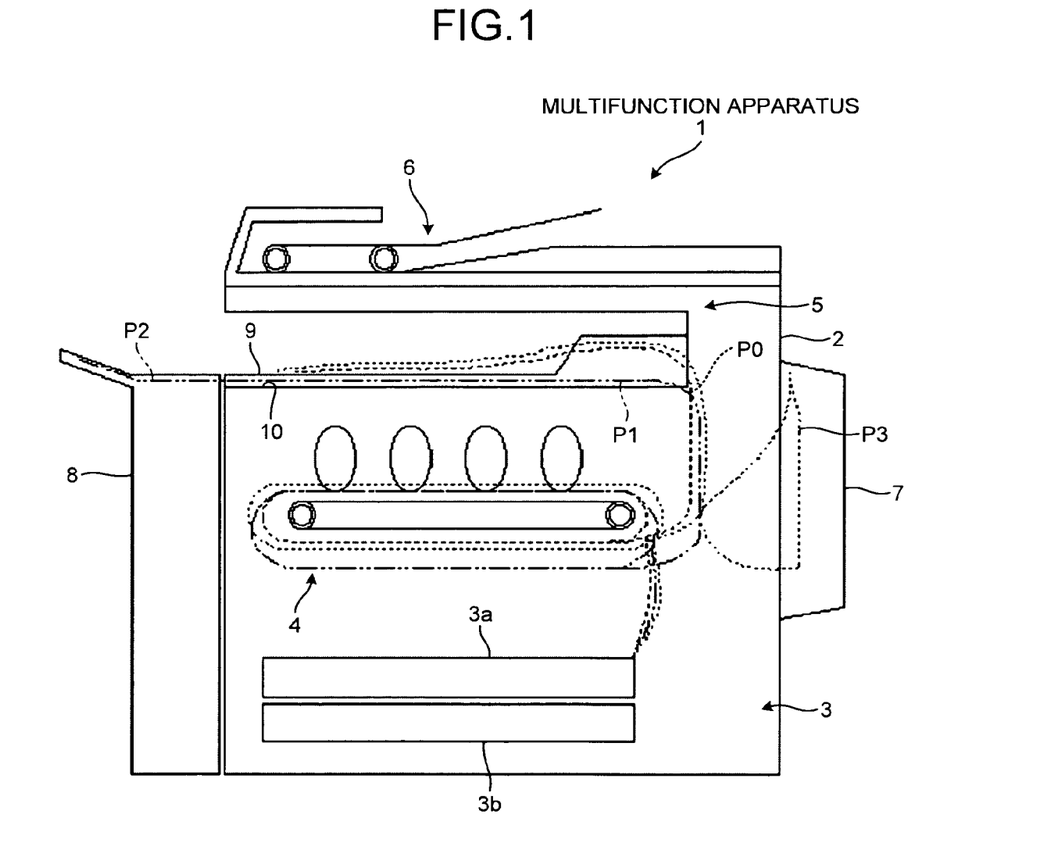
FIG. 1 is a schematic diagram illustrating a front view of a configuration of a multifunction apparatus according to an embodiment of the invention.

FIGS. 1 to 7 are diagrams illustrating an image forming apparatus, an image forming method, an image forming program, and a recording medium according to an embodiment of the invention. FIG. 1 is a configuration block diagram of a multifunction apparatus 1 to which an image forming apparatus, an image forming method, an image forming program, and a recording medium according to an embodiment of the invention are applied.

As illustrated in FIG. 1, the multifunction apparatus (image forming apparatus) 1 includes a sheet feeding unit 3, a printer unit 4, and a scanner unit 5 inside a body casing 2. The multifunction apparatus 1 also includes an automatic document feeder (ADF) 6, a duplex unit 7, a finisher 8, and the like, and further includes a sheet discharge tray 9 between the printer unit 4 and the scanner unit 5. Inside the body casing 2, the multifunction apparatus 1 also includes a relay unit 10 that conveys a sheet, on which an image has been formed, to the finisher 8. The multifunction apparatus 1 yet further includes other units, such as an operation display unit, which are not shown in the figure but are necessary to render the multifunction apparatus 1 operable, thereby performing multiple functions such as a scanning function, a printing function, a copying function, a facsimile function, and a data transmitting function.

The sheet feeding unit (a feeding unit) 3 includes a plurality of sheet feed trays (a media housing unit) 3a and 3b (two in FIG. 1), in which sheets (image formation media) of different sizes and different types can be housed. The sheet feeding unit 3 separates one sheet from a bundle of sheets in one of the sheet feed trays 3a and 3b, which is designated when printing is performed, and conveys the separated sheet to the printer unit 4.

The printer unit (image forming unit) 4 prints an image by an electrophotographic means on a sheet conveyed from the sheet feeding unit 3 and discharges a printed sheet to the sheet discharge tray (discharge tray) 9 or the finisher 8. The duplex unit 7 reverses the front and rear sides of the sheet with one side (the front side) which has been subjected to printing by the printer unit 4, conveys the reversed sheet to the printer unit 4 again, and causes the printer unit 4 to perform printing on the other side (the rear side) of the sheet in duplex printing.

The finisher (post-processing unit) 8 includes a plurality of sheet discharge trays (discharge trays) which are not shown in the figure. The finisher 8 includes post-processing mechanisms such as a staple mechanism that staples a bundle of sheets after printing, a punch mechanism that performs a punching process, and a folding mechanism that performs a sheet folding process. The finisher 8 performs designated post-processing on a bundle of sheets on which images are printed by the printer unit 4 and which are conveyed by the relay unit 10, and discharges the bundle of sheets onto the sheet discharge trays (the discharge trays). It also performs a sorting function of sequentially discharging a plurality of sets of printed sheets having the same page number on a plurality of the discharge trays, respectively.

When a simplex printing is carried out and a printed sheet is discharged to the sheet discharge tray 9, as denoted by a conveying path P0 in FIG. 1, the multifunction apparatus 1 conveys a sheet from the sheet feeding unit 3 to the printer unit 4 to cause the printer unit 4 to carry out a simplex printing, and conveys the printed sheet to the sheet discharge tray 9 to let the printed sheet be discharged. In addition, when a printed sheet after a simplex printing or a duplex printing is conveyed to the finisher 8 for post-processing, as denoted by a conveying path P1 and a conveying path P2 in the drawing of FIG. 1, the multifunction apparatus 1 conveys a sheet from the sheet feeding unit 3 to the printer unit 4 where the simplex printing is carried out. For a duplex printing, a second simplex printing is carried out by the printer unit 4 on a reverse side of the simplex printed sheet after being reversed by the duplex unit 7. Then, the printed sheet is conveyed, via a conveying path P1 included in the relay unit 10, to the finisher 8 where post-processing is carried out after passing through a conveying path P2, followed by discharging to the discharge trays included in the finisher 8. Accordingly, when the finisher 8 is used, a path length obtained by the sum of a length of the conveying path P1 included in the relay unit 10 and a length of the conveying path P2 included in the finisher 8 becomes longer than a length of a conveying path obtained when the finisher 8 is not used. Furthermore, when the multifunction apparatus 1 performs duplex printing and discharges printed sheets to the sheet discharge tray 9, the length of the conveying path inside the duplex unit 7, as illustrated in FIG. 1 with a symbol P3, is added to the length of the conveying path without a duplex printing. That is, when the multifunction apparatus 1 carries out duplex printing, a sheet is conveyed from the sheet feeding unit 3 to the printer unit 4 where simplex printing is carried out, and the sheet is conveyed to the duplex unit 7 where the sheet is reversed, and is further conveyed to the printer unit 4 to carry out another printing on a reversed side of the sheet, and then, the sheet is discharged to the sheet discharge tray 9. Therefore, the entire conveying path P is lengthened by the conveying path P3 inside the duplex unit 7.

The operation display unit (a notification unit and an operation unit) not shown in the figure includes various operation keys such as numeric keys and a start key as well as a display unit (a liquid crystal display, for example). The operation display unit admits various command operations such as a transmission operation, a copying operation, and a scanning operation through the operation keys, and displays contents of commands input through the operation keys or various kinds of information to be notified by the multifunction apparatus 1 to a user.

As the scanner unit 5, an image scanner including a charge coupled device (CCD) or a complementary metal oxide semiconductor (CMOS), for example, is used, and the ADF 6 is provided on the upper side of the scanner unit 5. Multiple sheets of document are set in the ADF 6, and the ADF 6 feeds the set document sheet by sheet to a document-scanning position of the scanner unit 5. The scanner unit 5 scans the document conveyed from the ADF 6, reads out images contained in the document at a predetermined resolution, binarizes the images, and outputs the images.

The multifunction apparatus 1 is connected to a transmission line such as a public telephone line which admits facsimile communications, a network, and the like. The multifunction apparatus 1 performs facsimile communications through the communication line and transmits data to and receives data from a host apparatus on the network through the network.

The multifunction apparatus 1, though not shown in the drawings, includes a controller including a central processing unit (CPU), a read only memory (ROM), a random access memory (RAM), and the like, an application-specific integrated circuit (ASIC) that performs image processing, a hard disk, and the like. The controller (a number acquiring unit, a feeding delay control unit, a return control unit, and a threshold setting unit) performs the basic functions as the multifunction apparatus 1 by controlling each unit of the multifunction apparatus 1 according to a program stored in the ROM and carries out an image formation process according to the invention in which an upper limit on the number of printable sheets is efficiently set by appropriately adjusting an inter-sheet spacing. Namely, the multifunction apparatus 1 is configured as an image forming apparatus that carries out an image formation process in which the upper limit on the number of printable sheets is efficiently set by performing an appropriate adjustment of an inter-sheet spacing, to be described later, by reading an image forming program executing the image forming process according to the present invention, which is recorded in a computer readable recording medium such as a ROM, an electrically erasable and programmable read only memory (EEPROM), an erasable programmable read only memory (EPROM), a flash memory, a flexible disc, a compact disc read only memory (CD-ROM), a compact disc rewritable (CD-RW), a digital versatile disk (DVD), a secure digital (SD) card, a magneto-optical disc (MO), and the like, and by installing the image forming program into the ROM or the hard disk. This image forming program is a computer-executable program that is described by a legacy programming language or an object oriented programming language such as assembler, C, C++, C#, or Java (registered trademark), or the like and can be distributed as being stored on the above-described recording medium.

Figure 2:
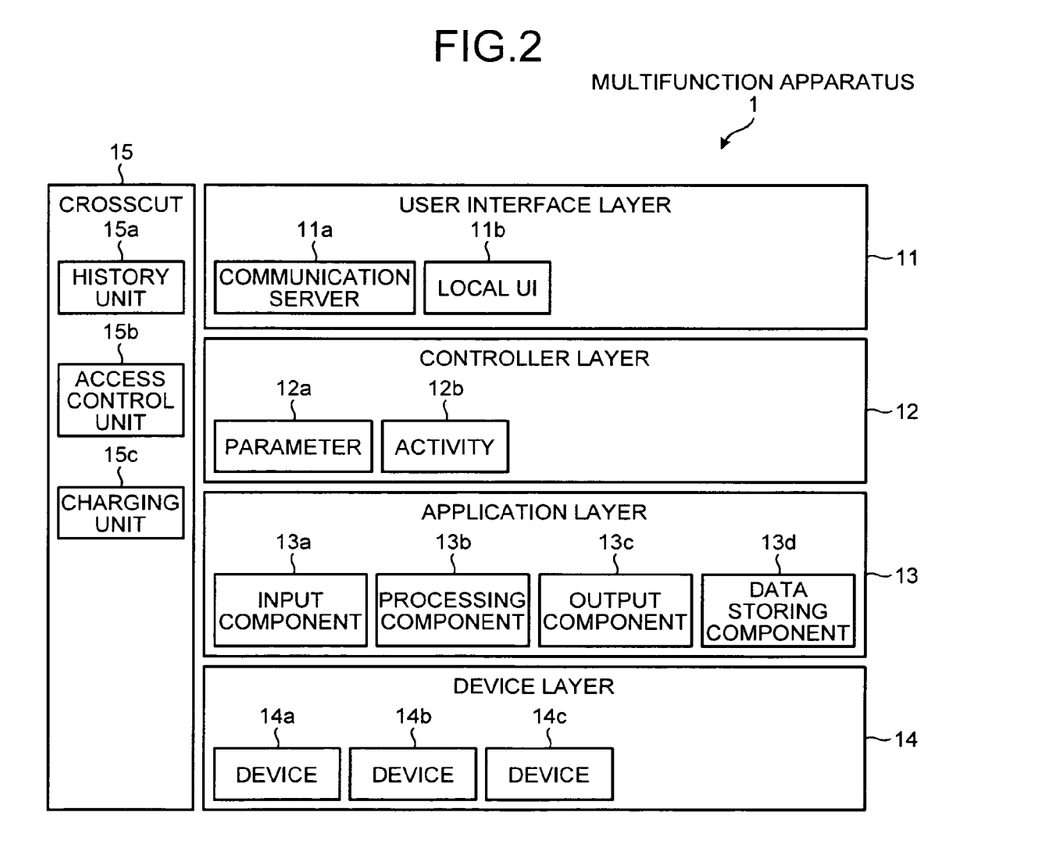
FIG. 2 is a functional block diagram of the multifunction apparatus illustrating the configuration thereof.

In the multifunction apparatus 1, the functional blocks as illustrated in FIG. 2 are configured by installing a basic program and an image forming program according to the invention. Basically, the multifunction apparatus 1, as illustrated in FIG. 2, includes a user interface layer 11, a controller layer 12, an application layer 13, a device layer 14, a crosscut 15, and the like.

The user interface layer 11 includes a communication server 11a and a local user interface (UI) 11b. The user interface layer 11 receives an external instruction, analyzes the instruction, and delivers the instruction to the controller layer 12. The communication server 11a is a block that receives an instruction transmitted through the network, and the local UI 11b is a block that receives an instruction input from the operation display unit.

The controller layer 12 includes a parameter 12a, an activity 12b, and the like. When an instruction is received from the user interface layer 11, the controller layer 12 stores the instruction in the parameter 12a, selects components, which are necessary for satisfying a user's request at the activity 12b, to be used from among components arranged in the application layer 13, and requests the using components to operate.

The application layer 13 includes an input component 13a, a processing component 13b, an output component 13c, a data storing component 13d, and the like, constituting a group of components, which are not limited to logical operations, to implement functions required by a user's instruction. The application layer 13 uses a plurality of components from among the components 13a to 13d to fulfill a user's request. The application layer 13 performs a process at each functional block in accordance with an instruction from the controller layer 12.

The device layer 14 controls devices 14a, 14b, 14c, . . . such as the network, the telephone line, the scanner unit 5, and the like that are included in the multifunction apparatus 1 in accordance with a request from the application layer 13.

The crosscut 15 is a functional block that is commonly used by all the blocks of the multifunction apparatus 1 and, for example, includes a history unit 15a, an access control unit 15b, a charging unit 15c, and the like. The history unit 15a is accessed by all the blocks that need to leave the history of the multifunction apparatus 1 and records the contents thereof. The access control unit 15b controls all the accesses in the multifunction apparatus 1. The charging unit 15c is accessed by all the blocks that operate under limitation imposed according to the charging and performs a process based on charging information.

Next, the operation of this embodiment will be described. The multifunction apparatus 1 according to this embodiment performs a printing process (an image forming process) as follows. After the number of sheets discharged to the sheet discharge tray 9 reaches a threshold set be smaller than the upper limit on the number of printable sheets, an inter-sheet spacing in feeding of sheets is adjusted to be longer. Thereafter, the printing is finally stopped at a time when the number of printed sheets reaches the upper limit on the number of printable sheets, or alternatively, the inter-sheet spacing is returned to normal inter-sheet spacing at a time when it is determined that the number of sheets to be printed is smaller than the upper limit, so as to perform printing.

In other words, the upper limit on the number of printable sheets of the multifunction apparatus 1 is set by a manager of the multifunction apparatus 1 or the like from the viewpoint of power saving, resource saving, and the like in using the multifunction apparatus 1. The upper limit on the number of printable sheets does not mean the upper limit on the number of sheets to be printed by using the multifunction apparatus 1; it is also possible to set the upper limit on the number of printable sheets, for example, per person using the multifunction apparatus 1, per department to which users belong, or the like and per predetermined period such as a month, a week, a day, or the like. When the upper limit on the number of printable sheets per person or department is set, the multifunction apparatus 1 performs personal authentication on a user who requests printing or a process of checking the department to which a user belongs.

Figure 3:
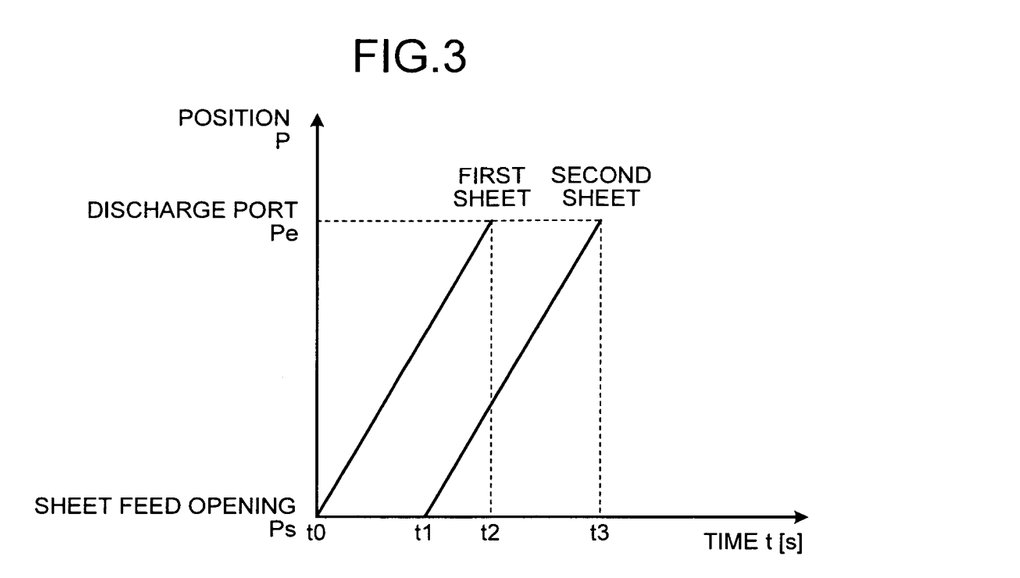
FIG. 3 is a diagram illustrating the timing for sheet conveyance in a short space mode.

Generally, in the multifunction apparatus 1, in order to improve the productivity of image formation (printing), for example, as illustrated in FIG. 3, when it is assumed, as for the time it takes for a sheet in the sheet feed tray 3a or 3b to be conveyed along a conveying path (a conveying route), from a sheet feed opening Ps to a discharge port Pe from which the sheet is discharged to the sheet discharge tray 9 or the sheet discharge tray of the finisher 8, the time is a period between t0 and t2 for a first sheet and a period between t1 and t3 for a second sheet as illustrated in FIG. 3, the conveyance of the second sheet from the sheet feed opening Ps is started before the first sheet is discharged from the discharge port Pe, and accordingly, the inter-sheet spacing between the first sheet and the second sheet is short, and there is a period between t1 and t2, in which the first sheet and the second sheet are concurrently present on the conveying path. That is, in normal printing, sheets are fed by the sheet feed trays 3a and 3b of the sheet feeding unit 3 in a small spacing mode under which a plurality of sheets, two sheets in FIG. 3, are concurrently present on the conveying path for printing.

When printing is sequentially performed at high speed in such a small spacing mode and then the conveying and the discharging of the sheets are performed, in a case where the number of printed sheets, that is, the count value of sheets discharged to the sheet discharge tray 9 and the like abruptly reaches the upper limit on the number of printable sheets, and thus the feeding of paper sheets is abruptly stopped, thereby placing a high load on the sheet feeding mechanism, as in a conventional case.

Thus, the multifunction apparatus 1 of this embodiment sets the threshold to be smaller than the upper limit, and at a time when the total number of printed sheets (a total number of image formation media) reaches the threshold, the multifunction apparatus 1 performs an adjustment of inter-sheet spacing such that the inter-sheet spacing in feeding of sheets is adjusted to be longer (a large spacing mode). Thereafter, when the total number of printed sheets reaches the upper limit on the number of printable sheets, the multifunction apparatus 1 stops image formation by terminating a feeding of a sheet from the sheet feeding unit 3, and automatically appropriately sets the threshold in accordance with printing conditions (image forming conditions) under which printing of a print job (image forming job) is performed. In addition, the multifunction apparatus 1 acquires the number of sheets used for printing (the number of sheets to be printed) during the printing of the print job, and when the total number of sheets to be printed is determined not to exceed the upper limit on the number of printable sheets, the multifunction apparatus 1 switches a feeding mode from the large spacing mode to the small spacing mode, whereby the image formation productivity is improved.

Now, as illustrated in FIG. 3, a case will be described in which an adjustment of an inter-sheet spacing is performed by taking account of the length of the conveying path P and the sheet size (a length in a conveying direction) of a sheet used for printing in the state in which printing is performed in the small spacing mode and the upper limit on the number of printable sheets is set.

The description below concerns a printing process that is accompanied with an inter-sheet space adjustment process when the multifunction apparatus 1 performs a copying process. However, the processing is not limited to the copying process as long as it accompanies a printing process (an image forming process). That is, it may also be applied to a printing process, a facsimile-reception/printing process, and the like.

When a user sets a document on the ADF 6 of the scanner unit 5 and selects a copying function, the multifunction apparatus 1 selects scanning by the scanner unit 5 as an input process and printing as an output process. When the user instructs the multifunction apparatus 1 to start a printing process by pressing a start key after setting post-processing and copying processing such as color selection, aggregation, and variable magnification through an operation display unit, the input component 13a allocates an area used for storing an image scanned by the scanner unit 5 in a memory space and instructs the scanner unit 5 to scan the paper document. Here, the data obtained through the scanning is temporarily stored in the memory area that is allocated beforehand.

When the scanning of the document using the scanner unit 5 is started, the multifunction apparatus 1 converts an output image, generated through a processing such as an editing or a production processing performed by the processing component 13b based on the print settings (such as the printing conditions or the image forming conditions) designated by the user, into CMYK data by using the output component 13c, and prints and outputs an image to a sheet conveyed to the printer unit 4 from the sheet feeding unit 3.

Since the inter-sheet space is set to be short, the multifunction apparatus 1 performs a series of processes, from the scanning of a document to the printing of an image on a sheet, as illustrated in FIG. 3, by means of parallel processing in which, before the printing of a first sheet of the document is completed, a second sheet of the document is scanned while printing of the first sheet of the document is performed, followed by the conveyance of the second sheet from the sheet feeding unit 3 to the printer unit 4 is started. In other words, in a portion in which the processing of the first sheet and the second sheet overlap each other along a time axis in FIG. 3, a plurality of sheets are concurrently present on the conveying path P.

Since the multifunction apparatus 1 counts up the number of printed sheets in a process in which a sheet, discharged to the sheet discharge tray 9 or the sheet discharge tray of the finisher 8, is detected using a paper sheet sensor which is not shown in the drawings, and the discharged sheets are counted using an internal counter of the controller, even when the number of printed sheets counted at the time of discharging reaches the upper limit on the number of printable sheets, the next sheet has been fed to the conveying path already. Accordingly, if the feeding of a sheet from the sheet feeding unit 3 is stopped when the counting of the internal counter reaches the upper limit on the number of printable sheets, and if a sheet that is already present on the sheet conveying path is printed and discharged, the number of printed sheets exceeds the upper limit on the number of printable sheets. Here, a combination of the paper sheet sensor and the controller serve, as a whole, as a discharge sheet counting unit that counts the number of sheets discharged to the sheet discharge tray 9 or the sheet discharge tray of the finisher 8.

The multifunction apparatus 1, as described above, has the function of extending its mechanism so as to selectively include the finisher 8 and the duplex unit 7 and additionally, as the image processing functions, has a multiple-pages-per-sheet printing function for printing a plurality of pages (in the description presented hereinafter, for the clarification of the description, two pages are assumed) into one sheet, a variable magnification function of magnifying or reducing images, and the like. Furthermore, since the total length of the sheet-conveying path changes depending on whether or not the finisher 8, the duplex unit 7, the multiple-pages-per-sheet printing function, or the variable-magnification printing function is used, the multifunction apparatus 1 sets the threshold depending on the use of these functions, and the inter-sheet spacing is adjusted between a normal spacing (i.e., the small spacing) and the large spacing based on the set threshold. While printing, at a time when it is found that the number of sheets that are going to be printed according to a current print job does not exceed the upper limit on the number of printable sheets, the multifunction apparatus 1 changes the inter-sheet spacing to the normal spacing even when the number of printed sheets exceeds the threshold.

Figure 5:
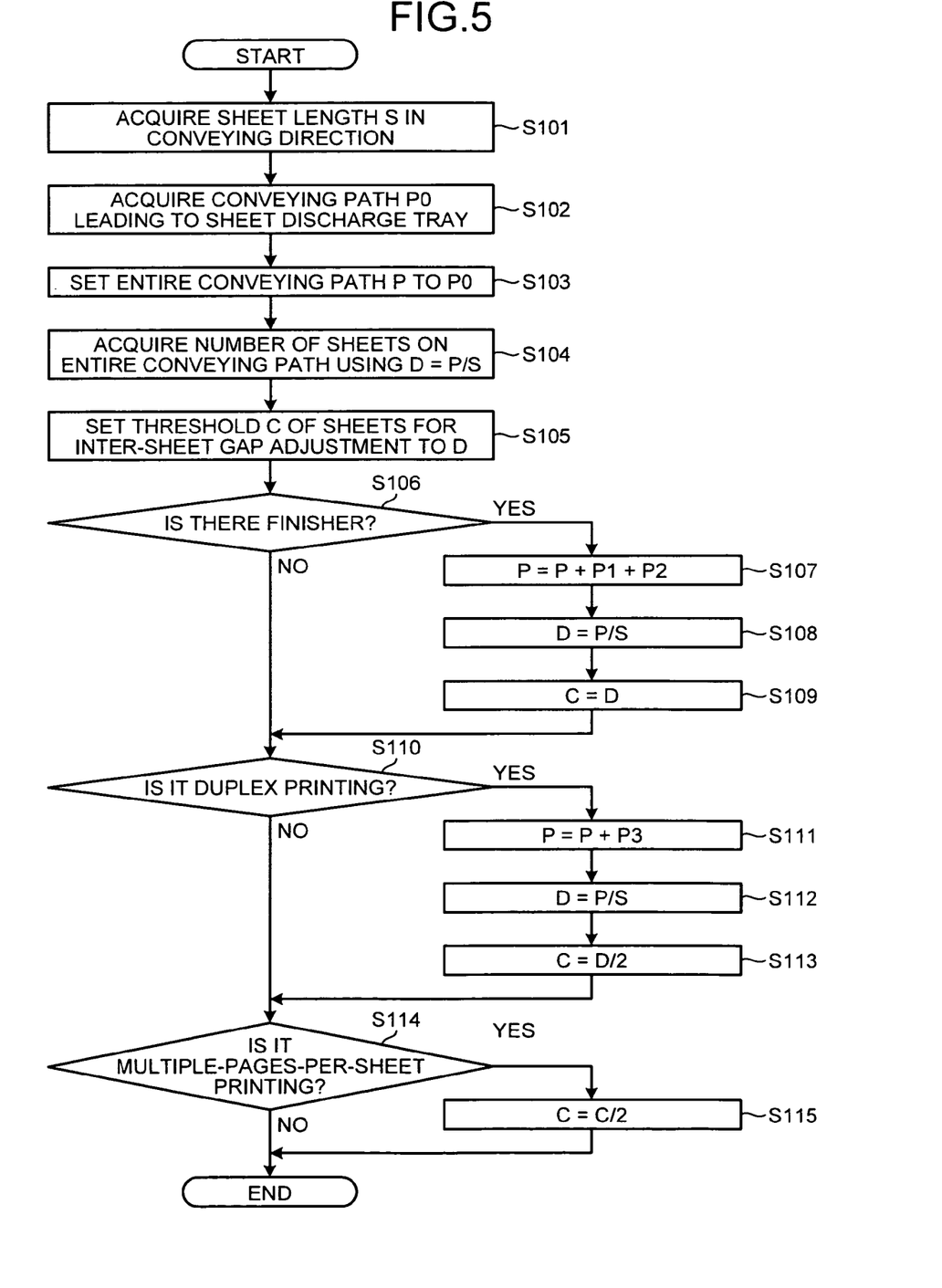
FIG. 5 is a flowchart illustrating a process of acquiring a threshold.

With reference to FIG. 5, the process of acquiring the inter-sheet space adjusting sheet number will be described based on the configuration of the multifunction apparatus 1 and the print settings.

When a printing process (an image forming process) on the basis of a print job (an image forming job) is started, the multifunction apparatus 1 acquires the sheet size (the length in the conveying direction) S of an output sheet from the print settings (Step S101) and, acquires a conveying path P0 from the sheet feed opening Ps of the sheet feed tray 3a or 3b to the discharge port Pe toward the sheet discharge tray 9 as a discharge destination of the sheet (Step S102). The multifunction apparatus 1 temporarily sets the conveying path P0 leading to the sheet discharge tray 9 as an entire conveying path of a printed sheet to the discharge destination (Step S103), acquires the number D of sheets on the entire conveying path P by dividing the length of the entire conveying path P by the sheet size S (D=P/S) (Step S104), and the multifunction apparatus 1 of this embodiment sets, as the threshold C, the number of sheets that is smaller than the upper limit L on the number of printable sheets by the number D of sheets present on the entire conveying path P (C=D, but actually C=L−D) in step S105.

Next, the multifunction apparatus 1 sets the entire conveying path P along the conveying path on which a printed sheet is lead to the discharge destination (the sheet discharge tray 9 or the sheet discharge tray of the finisher 8) based on the print settings and sets the threshold C with respect to the set entire conveying path P.

In other words, the multifunction apparatus 1, first, checks whether the finisher 8 is installed and the print settings include use of the finisher 8 (Step S106). When the print settings is set to include the use of the finisher 8, the multifunction apparatus 1 adds the conveying path P1 of the relay unit 10 and the conveying path P2 arranged inside the finisher 8 to the entire conveying path P that is temporarily set in step S103 as the conveying path P0 leading to the sheet discharge tray 9 (P=P+P1+P2) to obtain the entire conveying path P (Step 107).

When the entire conveying path P is calculated, the multifunction apparatus 1 calculates the number D of sheets that are present on the entire conveying path P (D=P/S, step S108), sets the calculated number D of sheets as the threshold C (Step S109), and checks whether or not duplex printing is set in the print settings (Step S110).

In a case where the print settings are determined not to use the finisher 8 in step S106, the multifunction apparatus 1 checks whether the duplex printing is set in the print settings (Step S110) and, when the duplex printing is set, in order to perform the duplex printing, the multifunction apparatus 1 conveys a sheet of which one side has been printed to the duplex unit 7, reverses the front and rear sides of the sheet, and performs printing on the rear side of the sheet again.

Accordingly, the multifunction apparatus 1 adds the conveying path P3 in the duplex unit 7 to the previously calculated entire conveying path P (P=P+P3) and sets the result of the addition as the entire conveying path P (Step S111).

After calculating the entire conveying path P for the duplex printing, the multifunction apparatus 1 calculates the number D of sheets to be present on the entire conveying path (D=P/S, step S112), and when the duplex printing is carried out, since printing processes are carried out on both sides of a sheet, the multifunction apparatus 1 sets ½ of the calculated number D of sheets as the threshold C (Step S113). Then, the multifunction apparatus 1 checks whether the print settings are set to carry out multiple-pages-per-sheet printing (Step S114).

By contrast, when the duplex printing is not set in step S110, the multifunction apparatus 1 checks whether the multiple-pages-per-sheet printing is set in the print settings in step S114, and when the multiple-pages-per-sheet printing is set, since document images contained in a plurality of pages are arranged in one sheet to be printed in the multiple-pages-per-sheet printing, the multifunction apparatus 1 sets the threshold C in accordance with a multiplicity (the multiplicity is two in FIG. 5) (C=C/n=C/2; here n is the multiplicity) and ends the processing (Step S115).

On the contrary, when the multiple-pages-per-sheet printing is not set in the print settings in step S114, the multifunction apparatus 1 keeps the threshold C that has been set already and ends the processing.

Figure 6:
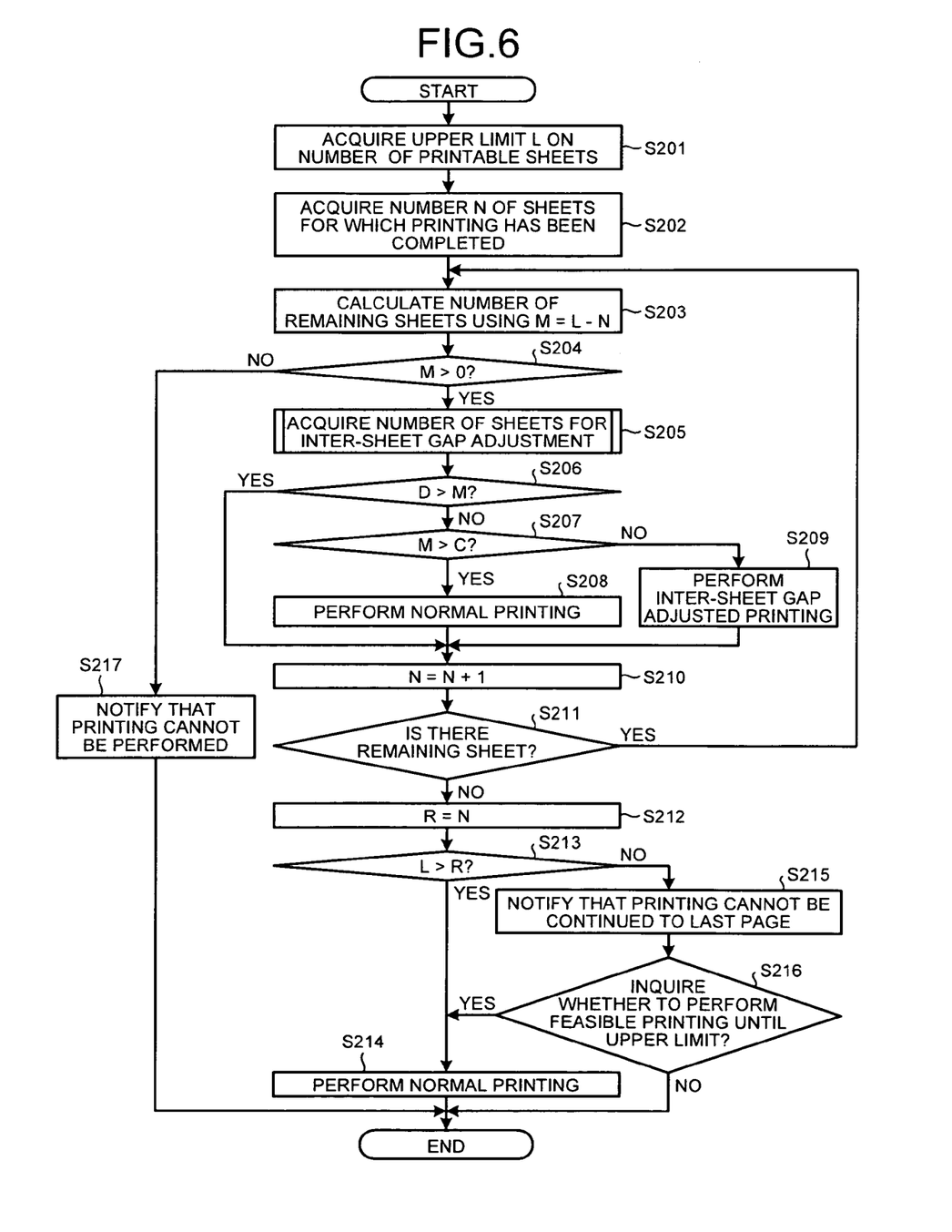
FIG. 6 is a flowchart illustrating a printing process accompanied by an inter-sheet space adjustment.

Then, the multifunction apparatus 1, as illustrated in FIG. 6, performs a printing process accompanying an adjustment of inter-sheet spacing. In other words, when the printing process (the image forming process) is started, the multifunction apparatus 1 first acquires the upper limit L on the number of printable sheets, which has been set beforehand (Step S201) and acquires the number N of printed sheets that is the number of sheets that have been printed already according to the instruction by a user during a period during which it is determined whether or not the total number of sheets reaches the upper limit L on the number of printable sheets in step S202. The multifunction apparatus 1 counts up the number N of sheets for which printing has been completed at the timing when one printed sheet is discharged to the sheet discharge tray 9 or the sheet discharge tray of the finisher 8 as described above.

Next, the multifunction apparatus 1 calculates the number M of remaining sheets to be printed that refers to the number of printable sheets until the number of printed sheets reaches the upper limit L on the number of printable sheets by subtracting the number of sheets for which printing has been completed from the upper limit L on the number of printable sheets (M=L−N) in step S203 and checks whether the number M of the remaining sheets for printing is positive (M>0), in other words, whether there are still remaining sheets that are allowed to be printed further in step S204. In a case where the number M of remaining sheets for printing is positive, the process of acquiring the threshold illustrated in FIG. 5 is performed, and the threshold C according to the print settings is acquired (Step S205).

When the threshold C is acquired through the process of acquiring the threshold, the multifunction apparatus 1 checks whether the number D of sheets on the entire conveying path P is larger than the number M of remaining sheets for printing (D>M) in step S206. In a case when the number D of sheets on the entire conveying path P is larger than the number M of remaining sheets for printing, the multifunction apparatus 1 stops a sheet feeding operation of the sheet feeding unit 3, increments the number N of sheets for which printing has been performed by one each time the sheet on the entire conveying path P is completed in printing and is discharged in step S210 without feeding a new sheet and performing printing for the new sheet, and checks whether there is a sheet on the entire conveying path P (Step S211).

In a case where there is a sheet on the entire conveying path in step S211, the multifunction apparatus 1 returns the process back to step S203 and performs the process of calculating the number M of remaining sheets for printing and the subsequent processes similarly to the description presented above (Steps S204 to S206 and S210). In this process, when the number D of sheets on the entire conveying path P is equal to or smaller than the number M of remaining sheets for printing, the sheet feeding operation of the sheet feeding unit 3 is restarted.

Then, when there is no sheet on the entire conveying path P in step S211, the multifunction apparatus 1 sets the number N of printed sheets N until the current print job as a total number R of printed sheets for a predetermined period (Step S212) and checks whether the upper limit L on the number of printable sheets is larger than the total number R of printed sheets (Step S213).

In addition, when the number D of sheets on the entire conveying path P is equal to or smaller than the number M of remaining sheets for printing in step S206, the multifunction apparatus 1 checks whether the number M of remaining sheets for printing is larger than the threshold C in step S207. In a case where the number M of remaining sheets for printing is larger than the threshold C, the multifunction apparatus 1 performs printing in a normal spacing mode (the small spacing mode) (hereinafter, referred to as normal printing) in step S208. The multifunction apparatus 1 performs normal printing and increments the number N of printed sheets by one each time a sheet on the entire conveying path P is completed in printing and is discharged in step S210 and checks whether there is any sheet remaining on the entire conveying path P in step S211. In other words, in a case where the number D of sheets present on the entire conveying path P is smaller than the number M of remaining sheets for printing but is larger than the threshold C, the multifunction apparatus 1 performs normal printing, discharge the sheet, and increments the number N of printed sheets, and in a case where there is a sheet present on the entire conveying path P, the multifunction apparatus 1 returns the process back to step S203, and performs the process of calculating the number M of remaining sheets for printing and the subsequent processes similarly to the description presented above in steps S204 to S208 and S210.

Figure 4:
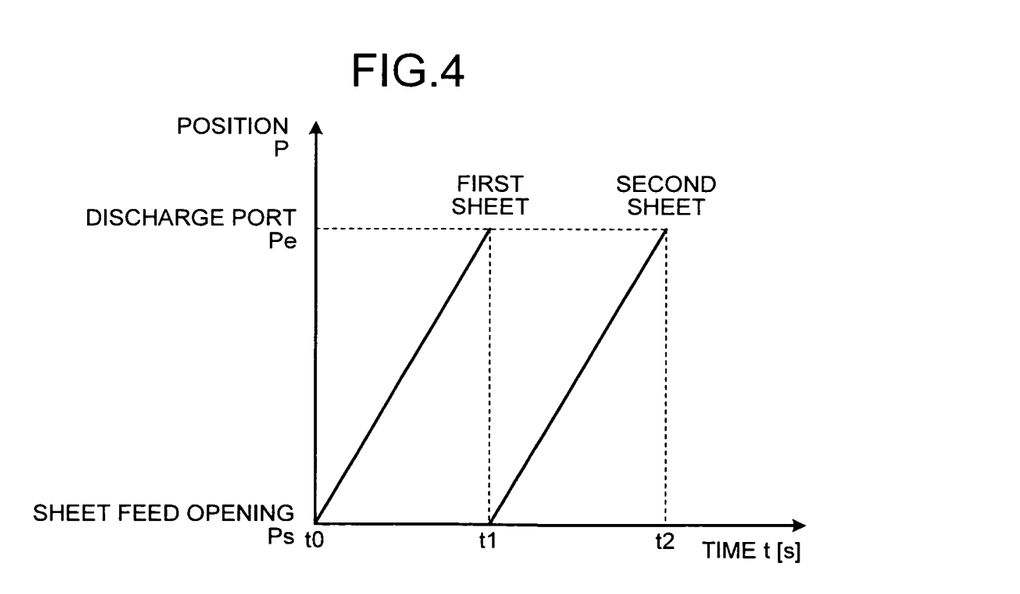
FIG. 4 is a diagram illustrating the timing for sheet conveyance in a long space mode.

When the number M of remaining sheets is equal to or smaller than the threshold C in step S207, the multifunction apparatus 1 determines that it is timing for inter-sheet spacing adjustment and performs printing (hereinafter, appropriately referred to as inter-sheet spacing adjusted printing) in step S209 by changing the feeding mode to large spacing mode under which at least a plurality of sheets are not present on the sheet conveying path, for example, under which, after the previous sheet as illustrated in FIG. 4 is discharged from the discharge port Pe to the sheet discharge tray 9 or the sheet discharge tray of the finisher 8, the next sheet is fed from the sheet feed opening Ps (long inter-sheet space). Then, every time the sheet on the entire conveying path P is completed in printing and is discharged, the multifunction apparatus 1 increments the number N of printed sheets by one in step S210 and checks whether there is any sheet present on the entire conveying path P in step S211.

When there is a sheet present on the entire conveying path P in step S211, the multifunction apparatus 1 returns the process back to step S203 and performs the process of calculating the number M of remaining sheets for printing and the subsequent processes similarly to the description presented above in steps S204 to S211.

Then, when there is no sheet present on the entire conveying path P in step S211, the multifunction apparatus 1 sets the number N of printed sheets N until the current print job as a total number R of printed sheets for a predetermined period in step S212 and checks whether the upper limit L of sheets for printing is larger than the total number R of printed sheets in step S213.

In a case where the upper limit L on the number of printable sheets is found to be larger than the total number R of sheets for printing in step S213, the multifunction apparatus 1 performs normal printing and ends the process (step S214).

In a case where the total number R of sheets for printing is found to be equal to or larger than the upper limit L on the number of printable sheets in step S213, the multifunction apparatus 1 notifies the user that printing cannot be continued to the last page using a method of displaying the notification on the display of the operation display unit not shown in the drawings or the like (Step S215) and inquires whether to continue feasible printing to the upper limit L on the number of printable sheets using a method of displaying an inquiry on the display or the like (Step S216).

When feasible printing is selected to be performed through an operation on the operation display unit or the like in step S216, normal printing is performed up to the upper limit L, and when the printing is performed up to the upper limit L, the printing process is ended (Step S214).

By contrast, when the feasible printing is not selected in step S216, i.e., when an interruption of the printing is selected, the printing process is terminated, and the process is ended.

Figure 7:
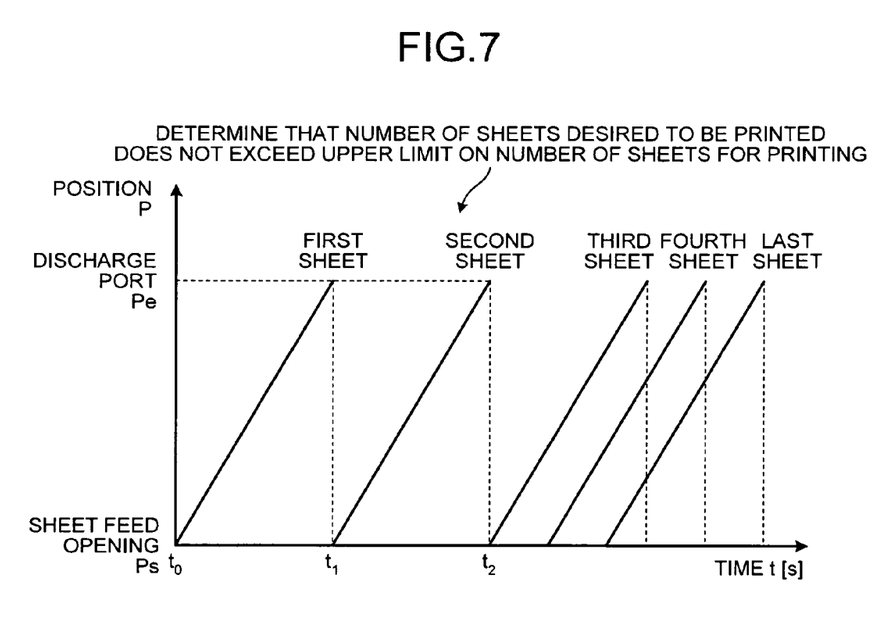
FIG. 7 is a diagram illustrating timing for sheet conveying in returning from an inter-sheet space-adjusted printing to a normal printing.

The multifunction apparatus 1 of this embodiment, in the process of steps S203 to S211, acquires the threshold C through the process of acquiring the threshold in step S205. In a case where the number of sheets presented on the entire conveying path P becomes equal to or smaller than the number M of remaining sheets for printing and the number M of remaining sheets for printing becomes equal to or smaller than the threshold C, as described above, the multifunction apparatus 1 changes the normal printing to the inter-sheet spacing adjusted printing in which the inter-sheet spacing is set to be larger than that in the normal printing (the large spacing mode), as illustrated in FIG. 7, during the inter-sheet spacing adjusted printing, acquires the number M of remaining sheets for printing in step S203, acquires the threshold C in step S205, and acquires the number of printed sheets in step S207. Thus, when it is determined that the number M of remaining sheets for printing is larger than the threshold C, in other words, the number of printed sheets of a print job does not exceed the upper limit L on the number of printable sheets, the process is switched to printing (normal printing) with a normal spacing, and printing is continued to the end of the print job according to steps S208, S210, S211, S203 to S208, S210, and S211.

In addition, when the number M of remaining sheets for printing is found to be equal to or smaller than zero in step S204, the multifunction apparatus 1 notifies of impossibility in carrying out the printing process by displaying the information on the display of the operation display unit or the like and ends the printing process in step S217.

In the description presented above, the threshold C is set depending on use of the finisher 8 and inclusion of the duplex unit 7 and multiple-pages-per-sheet printing as print settings. However, the printing conditions are not limited thereto. For example, the threshold C may be set in accordance with the enlargement/contraction (variable magnification) of an image or the like.

As above, when sheets, which are fed, one by one, from the sheet feeding unit 3 in the small spacing mode under which at least a sheet that has been fed beforehand is present on the conveying path P, are conveyed on the conveying path P from the sheet feeding unit 3 to the sheet discharge tray 9 or the sheet discharge tray of the finisher 8 through the printer unit 4, and are discharged to the sheet discharge tray 9 or the like, the multifunction apparatus 1 of this embodiment counts the number of sheets discharged to the sheet discharge tray 9 or the like and, when the count value reaches the threshold set to be smaller than a predetermined upper limit on the number of printable sheets by which image forming is limited, feeds the sheets from the sheet feeding unit 3 in the large spacing mode under which a sheet is sent out after at least the previous sheet is discharged from the conveying path P and, in a case where, after starting to feed the sheets in the large spacing mode, a total number of printed sheets acquired by adding the count value to the number of printed sheets of a print job is smaller than the upper limit on the number of printable sheets, switches the feeding mode from the large spacing mode to the small spacing mode and sets the threshold based on the printing conditions used for forming images on the sheets.

Accordingly, image formation is performed while conveying sheets in the small spacing mode under which a plurality of sheets is present on the conveying path P. Then, when the number of printed sheets reaches the threshold set to be smaller than the upper limit on the number of printable sheets, the adjustment of inter-sheet spacing is performed in which sheets are conveyed in which the inter-sheet spacing is adjusted to be longer, and, when the number of printed sheets is determined not to exceed the upper limit on the number of sheets by the print job, the inter-sheet spacing can be returned to the original small spacing. Therefore, printing limitations for appropriately limiting the supply of sheets can be appropriately applied while appropriately improving the productivity of image formation.

In addition, according to the multifunction apparatus 1 of this embodiment, in a case where the total number of sheets to be printed (a total number of images to be formed) exceeds the upper limit on the number of printable sheets, the sheet feeding, the image formation and the sheet conveying operation are temporally stopped, and a notification indicating that image forming cannot be continued to the last page of the image forming job and an inquiry on whether or not to continue image forming up to the upper limit on the number of printable sheets are displayed on the display of the operation display unit or the like. Then, when it is instructed by a user either to continue printing (image forming) up to the upper limit on the number of printable sheets or to stop printing, the process is performed in accordance with the instruction.

Accordingly, when the number of sheets to be printed exceeds the upper limit on the number of printable sheets during printing, the notification thereof can be acquired by the user, and the user can select whether or not to perform printing up to the upper limit on the number of printable sheets, whereby the usability of the multifunction apparatus 1 may be improved.

Furthermore, according to the multifunction apparatus 1 of this embodiment, when the number of sheets present on the conveying path P is larger than the number of remaining sheets (the number of remaining media) that is acquired by subtracting the counted number of the sheets discharged to the sheet discharge tray 9, the sheet discharge tray of the finisher 8, or the like from the upper limit on the number of printable sheets, the multifunction apparatus 1 stops the feeding of the sheet from the sheet feeding unit 3 and stands by. Then, when the number of sheets on the conveying path becomes smaller than the number of remaining sheets to be printed, the multifunction apparatus 1 restarts the feeding of sheets by the sheet feeding unit 3.

Therefore, by stopping unnecessary printings, printing materials such as sheets, ink, and toner can be saved.

In addition, according to the multifunction apparatus 1 of this embodiment, the threshold is set based on the sheet size included in the printing conditions. That is, the threshold is set based on the length of the conveying path as one of the image forming conditions and the length of the sheet, which is fed to the conveying path, in the conveying direction.

Accordingly, the threshold can be set easily and at low cost by taking account of the number of sheets on the conveying path, whereby the printing limitation can be appropriately applied at low cost while improving the productivity of printing (image forming).

Furthermore, the multifunction apparatus 1 of this embodiment sets the inter-sheet space adjusting sheet number by taking into account, as the print settings, whether to carry out duplex printing, multiple-pages-per-sheet printing, or a variable magnification process besides considering the sheet size.

Therefore, the threshold can be set by taking account of the length of the conveying path in the duplex unit 7 and the length of the conveying path in the finisher 8, and the inter-sheet space can be adjusted by considering a possible inclusion of the multiple-pages-per-sheet printing or variable-magnification printing. Accordingly, the printing limitations can be more appropriately applied by a more appropriate performing of the inter-sheet spacing adjustment.

According to the present invention, image forming is performed while image formation media is conveyed in a small spacing mode under which a plurality of image formation media is present on a conveying path. Further, when the number of formed images reaches a threshold set to be smaller than a predetermined upper limit on the number of media for image forming, an adjustment of inter-media spacing is performed such that media are conveyed in a large spacing mode under which an inter-media spacing is adjusted to be longer, and, when it is determined that the number of images to be formed according to an image forming job does not exceed the upper limit on the number of media, the inter-media spacing is changed back to the original small spacing and, accordingly, it is possible to have an appropriate control on the limit on supplying media while appropriately improving the productivity of image formation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a medium housing unit that houses a plurality of image formation media;
   an image forming unit that forms an image on the image formation medium;
   a discharge tray to which the image formation medium having the image formed thereon by the image forming unit is discharged;
   a feeding unit that feeds the image formation media one by one from the medium housing unit;
   a conveying unit that conveys the image formation medium fed from the medium housing unit by the feeding unit onto a conveying path extending from the medium housing unit to the discharge tray through the image forming unit;
   a counting unit that counts the number of image formation media discharged to the discharge tray within a predetermined period, by detecting the image formation media discharged to the discharge tray;
   a number acquiring unit that acquires, from an image forming job, the number of image formation media on which images are formed according to the image forming job;
   a feeding delay control unit that causes the feeding unit to
      feed the image formation medium in a small spacing mode under which a next image formation medium is fed during at least a previously-fed image formation medium is present on the conveying path and
      feed the image formation medium in a large spacing mode under which a next image formation medium is fed after at least a previously-fed image formation medium is discharged from the conveying path, by switching a feeding mode from the small spacing mode to the large spacing mode at a time when a count value of the counting unit reaches a threshold set to be smaller than an upper limit by which image formation is limited;
   a return control unit that, when a total number of image formation media on which images have been formed is smaller than the upper limit after the image formation media is started to be fed in the large spacing mode, switches the feeding mode from the large spacing mode to the small spacing mode so as to allow the feeding unit to feed the image formation media in the small spacing mode, the total number of image formation media being acquired by adding the count value of the counting unit to the number of image formation media acquired from the image forming job by the number acquiring unit; and
   a threshold setting unit that sets the threshold based on image forming conditions used for forming images on the image formation media.

2. The image forming apparatus according to claim 1, further comprising:
   a notification unit;
   an operation unit; and
   an image formation control unit that
      temporarily stops operations of the feeding unit, the image forming unit, and the conveying unit when the total number of image formation media exceeds the upper limit,
      causes the notification unit to issue notification indicating that image formation cannot be continued to a last page of the image forming job and to issue an inquiry on whether or not to continue to perform image formation up to the upper limit, and
      causes, when an instruction to continue the image formation up to the upper limit or to stop the image formation is issued through the operation unit, the image forming unit to perform a process in accordance with the instruction.

3. The image forming apparatus according to claim 2, wherein the image formation control unit
   temporarily stops the operation of the feeding unit so as to wait when the number of image formation media that are present on the conveying path is larger than the number of remaining media that is obtained by subtracting the count value of the counting unit from the upper limit, and starts the operation of the feeding unit when the number of the image formation media present on the conveying path is equal to or smaller than the number of the remaining media.

4. The image forming apparatus according to claim 1, wherein the threshold setting unit sets the threshold based on a length of the conveying path and a length of the image formation medium, which is fed to the conveying path, in a conveying direction.

5. The image forming apparatus according to claim 4, wherein the threshold setting unit sets the threshold based on the length of the conveying path that varies in accordance with image forming conditions when there are the image forming conditions that affect the length of the conveying path of the image formation medium.

6. The image forming apparatus according to claim 1, wherein, when the image forming conditions include either a variable magnification condition or multiple-pages-per-sheet printing condition, the threshold setting unit sets the threshold based on a magnification ratio designated by the variable magnification condition or a multiplicity designated by the multiple-pages-per-sheet printing condition.

7. The image forming apparatus according to claim 4, further comprising:
at least one of a duplex unit that reverses front and rear sides of the image formation medium having the image formed on its front side by the image forming unit and feeds the image formation medium to the image forming unit again and a post-processing unit that performs post-processing on the image formation medium having the image formed thereon,
wherein, when any of a duplex image forming process in which images are formed on both sides of the image formation medium and the post-processing that is performed by the post-processing unit is set as the image forming condition, the threshold setting unit sets the threshold by using a length of a conveying path that includes a length of a conveying path of the duplex unit or a length of a conveying path of the post-processing unit as the length of the conveyance in accordance with the setting of the image forming condition.

8. The image forming apparatus according to claim 6, further comprising:
at least one of a duplex unit that reverses front and rear sides of the image formation medium having the image formed on its front side by the image forming unit and feeds the image formation medium to the image forming unit again and a post-processing unit that performs post-processing on the image formation medium having the image formed thereon,
wherein, when any of a duplex image forming process in which images are formed on both sides of the image formation medium and the post-processing that is performed by the post-processing unit is set as the image forming condition, the threshold setting unit sets the threshold by using a length of a conveying path that includes a length of a conveying path of the duplex unit or a length of a conveying path of the post-processing unit as the length of the conveyance in accordance with the setting of the image forming condition.

9. An image forming method comprising:
feeding, from a medium housing unit that houses a plurality of image formation media, the image formation media one by one;
forming an image on the image formation medium;
conveying the image formation medium fed from the medium housing unit at the feeding onto a conveying path extending from the medium housing unit to a discharge tray through the forming;
counting the number of image formation media discharged to the discharge tray within a predetermined period, by detecting the image formation media discharged to the discharge tray;
acquiring, from an image forming job, the number of image formation media on which images are formed according to the image forming job;
feeding the image formation medium in a small spacing mode under which a next image formation medium is fed during at least a previously-fed image formation medium is present on the conveying path and
feeding the image formation medium in a large spacing mode under which a next image formation medium is fed after at least a previously-fed image formation medium is discharged from the conveying path, by switching a feeding mode from the small spacing mode to the large spacing mode at a time when a count value at the counting reaches a threshold set to be smaller than an upper limit by which image formation is limited;
switching, when a total number of image formation media on which images have been formed is smaller than the upper limit after the image formation media is started to be fed in the large spacing mode, the feeding mode from the large spacing mode to the small spacing mode so as to feed the image formation media in the small spacing mode, the total number of image formation media being acquired by adding the count value at the counting to the number of image formation media acquired from the image forming job at the acquiring; and
setting the threshold based on image forming conditions used for forming images on the image formation media.

10. A computer program product comprising a non-transitory computer-readable medium having computer-readable program codes recorded in the medium for forming an image in an image forming apparatus that includes a medium housing unit, an image forming unit, a discharge tray, a feeding unit, and a conveying unit, the program codes when executed causing a computer to execute:
feeding, from the medium housing unit that houses a plurality of image formation media, the image formation media one by one by the feeding unit;
forming an image on the image formation medium by the image forming unit;
conveying the image formation medium fed from the medium housing unit by the feeding unit onto a conveying path extending from the medium housing unit to the discharge tray through the forming;
counting the number of image formation media discharged to the discharge tray within a predetermined period, by detecting the image formation media discharged to the discharge tray;
acquiring, from an image forming job, the number of image formation media on which images are formed according to the image forming job;
causing the feeding unit to
feed the image formation medium in a small spacing mode under which a next image formation medium is fed during at least a previously-fed image formation medium is present on the conveying path and
feed the image formation medium in a large spacing mode under which a next image formation medium is fed after at least a previously-fed image formation medium is discharged from the conveying path, by switching a feeding mode from the small spacing mode to the large spacing mode at a time when a count value at the counting reaches a threshold set to be smaller than an upper limit by which image formation is limited;

switching, when a total number of image formation media on which images have been formed is smaller than the upper limit after the image formation media is started to be fed in the large spacing mode, the feeding mode from the large spacing mode to the small spacing mode so as to feed the image formation media in the small spacing mode, the total number of image formation media being acquired by adding the count value at the counting to the number of image formation media acquired from the image forming job at the acquiring; and setting the threshold based on image forming conditions used for forming images on the image formation media.

* * * * *